United States Patent [19]
Nagata et al.

[11] Patent Number: 5,237,645
[45] Date of Patent: Aug. 17, 1993

[54] PRINTING APPARATUS

[75] Inventors: Masato Nagata; Yasuhiro Shimizu; Seiji Asano; Mikio Takashi, all of Tokyo, Japan

[73] Assignee: Oki America Industry Co., Ltd., Tokyo, Japan

[21] Appl. No.: 783,729

[22] Filed: Oct. 28, 1991

Related U.S. Application Data

[63] Continuation of Ser. No. 318,795, Mar. 3, 1989, abandoned.

[30] Foreign Application Priority Data

Mar. 9, 1988 [JP] Japan .................................. 63-53555
Jun. 16, 1988 [JP] Japan .................................. 63-146764

[51] Int. Cl.$^5$ .......................... G06F 3/12; G06F 15/62
[52] U.S. Cl. .................................... 395/115; 364/235; 364/246.3; 364/254.3; 364/256.5; 364/930; 364/966.4; 364/961.2
[58] Field of Search ................. 395/425, 115, 116, 117

[56] References Cited

U.S. PATENT DOCUMENTS 4,074,254 2/1978 Belser et al. .................. 340/324
4,555,802 11/1985 Fedak et al. ................... 382/56

FOREIGN PATENT DOCUMENTS 0153877 2/1985 European Pat. Off. .
0310228 7/1988 European Pat. Off. .
59-100976 6/1984 Japan .
60-74085 4/1985 Japan .

Primary Examiner—Eddie P. Chan
Attorney, Agent, or Firm—Panitch Schwarze Jacobs & Nadel

[57] ABSTRACT

In a printing apparatus for printing on printing paper, page by page, wherein print data of each of virtual pages are divided into blocks, print data of effective blocks are stored in an image memory, while print data of empty blocks are not stored in the image memory, and instead information indicating the emptiness is stored. During supply of the print data to a printing section, empty data are generated from the information on the emptiness, while effective data are read out of the image memory. The empty data and the effective data are assembled and supplied to the printing section.

7 Claims, 10 Drawing Sheets

PRINTING APPARATUS

This is a continuation of U.S. application Ser. No. 07/318,795, filed Mar. 3, 1989, now abandoned.

BACKGROUND OF THE INVENTION

The present invention relates to a printing apparatus for storing print data in an image memory and reading the print data for printing on printing paper.

Known devices for printing on paper in accordance with print data generated by a host control unit, such as a computer or a word processor include electrophotograph printers, thermal printers, wire-dot printers, and many others.

The prior art printing apparatus have limitations with respect to the operating speed or the memory size and the cost.

SUMMARY OF THE INVENTION

An object of the invention is to eliminate the above problems.

Another object of the invention is to enable an increase of the speed of the operation of a printing apparatus.

Another object of the invention is to provide a printing apparatus which does not require an increase of the capacity of the memory.

Another object of the invention is to provide a printing apparatus in which the time clearance of the memory before writing can be reduced.

A printing apparatus according to the present invention is for printing on printing paper, page by page, wherein print data of each of virtual pages are divided into blocks.

The printing apparatus comprises:

a working memory for storing print data of virtual pages, an image memory for storing print data of effective blocks containing effective data, a printing section receiving the print data from the image memory for printing on the printing paper, an image memory control section for controlling writing of the print data in said image memory, and reading of the print data from the image memory,
wherein
said image memory control section comprises a block identifying section responsive to the print data from the working memory for each block to determine whether each block is an effective block containing effective data or an empty block containing no effective data, an address converting section for correlating the block addresses of the effective blocks within said virtual page with the block addresses within said image memory in which the data of said effective blocks are written, and storing mapping flags for indicating whether each block of the virtual page is an effective block or an empty block, and page identification flags for identifying the virtual page to which data of each effective block that have been written in said image memory belongs, a memory block assignment control section receiving the result of the identification by said block identification and referring to said address converting section for assigning, during writing of the print data in said image memory, a block in the image memory that is available for print data of an effective block, said memory block assignment control section controlling the writing of the print data of the effective blocks in said image memory, and storing information on the print data of the empty block, and supplying the print data of the effective blocks from the image memory to the printing section, and supplying the print data of the empty blocks to said printing section.

DETAILED DESCRIPTION OF THE EMBODIMENTS

Embodiments of the present invention will now be described with reference to the drawings.

Figure 1:
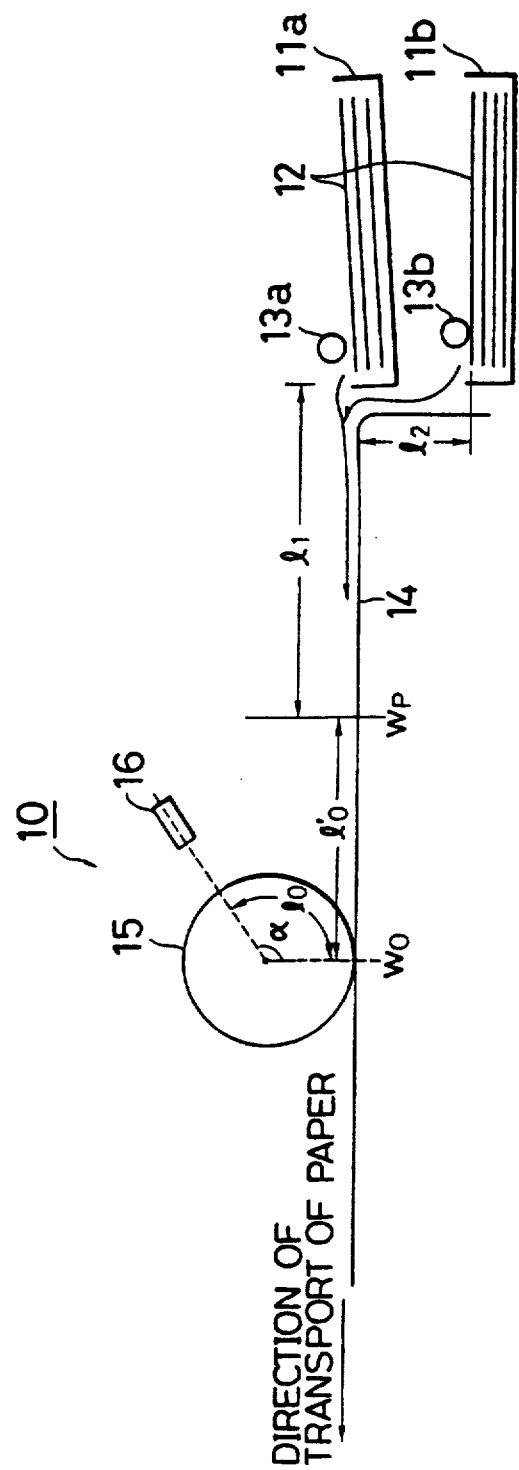
FIG. 1 is a schematic diagram showing a printing apparatus according to the invention.
Figure 2:
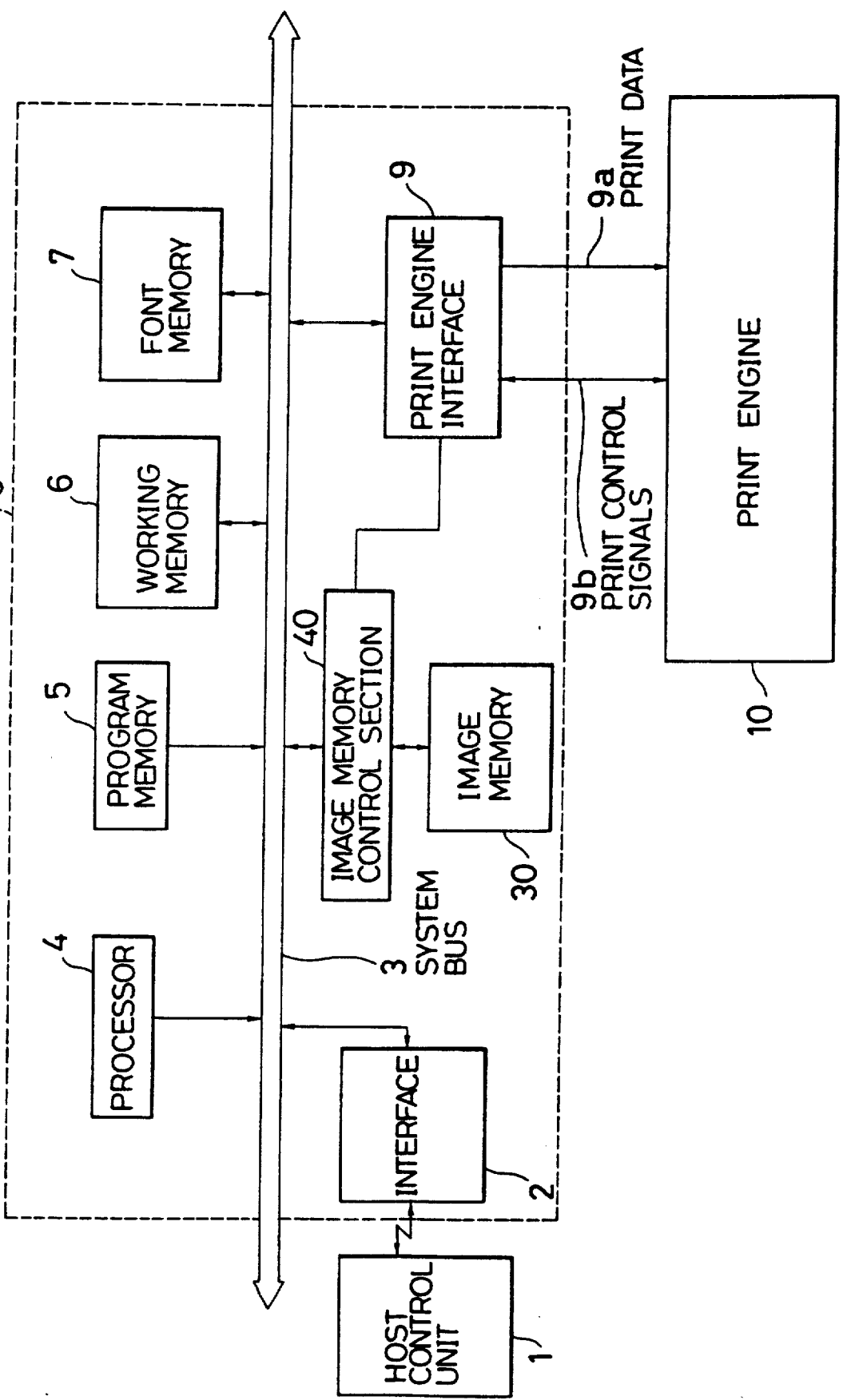
FIG. 2 is a block diagram showing a print control unit.

FIG. 1 is a schematic view showing an electrophotograph printing apparatus, taken as an example for describing the invention. FIG. 2 is a block diagram showing a print control unit 8 which is incorporated in the printing apparatus of FIG. 1.

Trays 11a and 11b contain sheets of printing paper 12 that are stacked. This printing paper 12 is picked up, one sheet at a time, by a hopping roller 13a or 13b and is made to travel along a transport path 14.

A photosensitive drum 15 having a photosensitive layer on the periphery is disposed on the transport path 14. A writing device 16 writes electrostatic latent image on the outer periphery of the photosensitive drum 15. The photosensitive drum 15 is rotated in synchronism with the writing by the writing device 16. The writing device 16 is formed, for example, of a light-emitting diode array, a laser head, or the like. In the case of light-emitting diodes array, an array of light-emitting diodes "writes" an image onto the drum, one row of dots at a time. In the case of a laser beam printer, a beam of light "writes" the image onto the drum, while being scanned along the length of the drum. The image data or pixel signals to be written are supplied from an image memory 30 in the print control unit 8, shown in FIG. 2.

In FIG. 2, a system bus 3 is connected via an interface 2 to a host control unit 1. Connected to this system bus 3 are a processor (central processing unit, or CPU) 4, a program memory 5, a working memory 6, a font memory 7, an image memory control section 40, and a print engine interface 9. The image memory 30 is connected to the image memory control section 40. Connected to the print engine interface 9 is a print engine 10 which includes the writing device.

The host control unit 1 is a device such as a computer, a word processor, or an image reading device, which generates print data. The interface 2 is a known circuit formed for example of a serial interface, such as the one identified by RS232C interface, or a parallel interface. The processor 4 performs control over the entire printing apparatus. The program for the operation of the processor 4 is stored in the program memory 5. The working memory 6 is formed of a random access memory, and stores and manages the data supplied through the interface 2. The font memory 7 converts character codes and other codes sent from the host control unit 1 into print font data, i.e., pixel signals representing the dots or pixels of print output.

The image memory 30 is a random access memory for storing the print data that have been edited into the form of an image consisting of pixel signals. The image memory 30 has a capacity for image data or pixel signals making up one print output page, i.e., one complete page of printed paper. The image memory control section 40 controls writing in and reading from the image memory 30. It will later be described in further detail.

As mentioned above, the print engine 10 includes the writing device 16 shown in FIG. 1, and is responsive to the print data stored in the image memory 30 for printing on printing paper. The print engine interface 9 is an interface which follows the instructions from the processor 4 to read print data 9a from the image memory 30, to transfer the print data 9a to the print engine 10 or to accept print control signals 9b output from the print engine 10 and to transmit the control signals 9b to the processor 4 and other components.

In a printing apparatus as described above, control commands, character codes, graphic commands, bit image data, and the like transmitted from the host control unit 1 via the interface 2 are stored in the working memory 6, and translated under control of the processor 4 into print data in the form of pixel signals and stored in the image memory 30.

The image memory control section 40 will later be described in further detail.

As the writing device 16 writes data on the photosensitive drum 15, electrostatic latent image corresponding to the print data is created in succession. The latent image is developed by use of toner and transferred onto printing paper 12 and fixed. This printing process is effected continuously and cannot be interrupted. Accordingly, the transport of the printing paper is commenced after the print data is completely edited into the image memory 30.

In this apparatus, when the printing paper 12 is transported along the transport path 14 and reaches a transfer position Wo, the toner on the photosensitive drum 15 is transferred, and fixed by a fixing device, not shown, and the paper is then discharged. The transport of the printing paper 12 is interrupted at a point Wp on the transport path by a resist roller or the like, for standby, and resumed simultaneously with the writing of the latent image by the writing device 16. That is, while the photosensitive drum 15 rotates by $l_0$ (angle $\alpha$), the printing paper 12 is transported by $l_0'$ to reach the transfer position Wo.

In order for the paper to reach the transfer position Wo in time with that part of the drum at which the corresponding image data are written, the print data are transferred from the image memory 30 in FIG. 2 to the writing device 16 when the hopping roller 13a has transported the printing paper 12 by $l_1$, or the hopping roller 13b has transported the printing paper 12 by $l_1 + l_2$.

As will be clearer from the later description, the invention is featured by division of each virtual page into blocks, each containing data corresponding pixels forming a rectangular, e.g., square part on the page of the print output. In the example which will be described, each block contains 128×128 pixels, and one page consists of 8 rows ×10 columns of blocks. Blocks containing no effective data are regarded as an empty block, and the pixel signals for such an empty block are not stored in the image memory 30, but instead information indicating the emptiness is stored in a separate memory, to be described later, and a block of empty data (all "0") are supplied to the print engine 10 when the writing device 16 writes the image data on the drum 15.

Before describing how the image data are supplied to the writing device 16 according to the invention, the prior-art method will first be explained.

Figure 4:
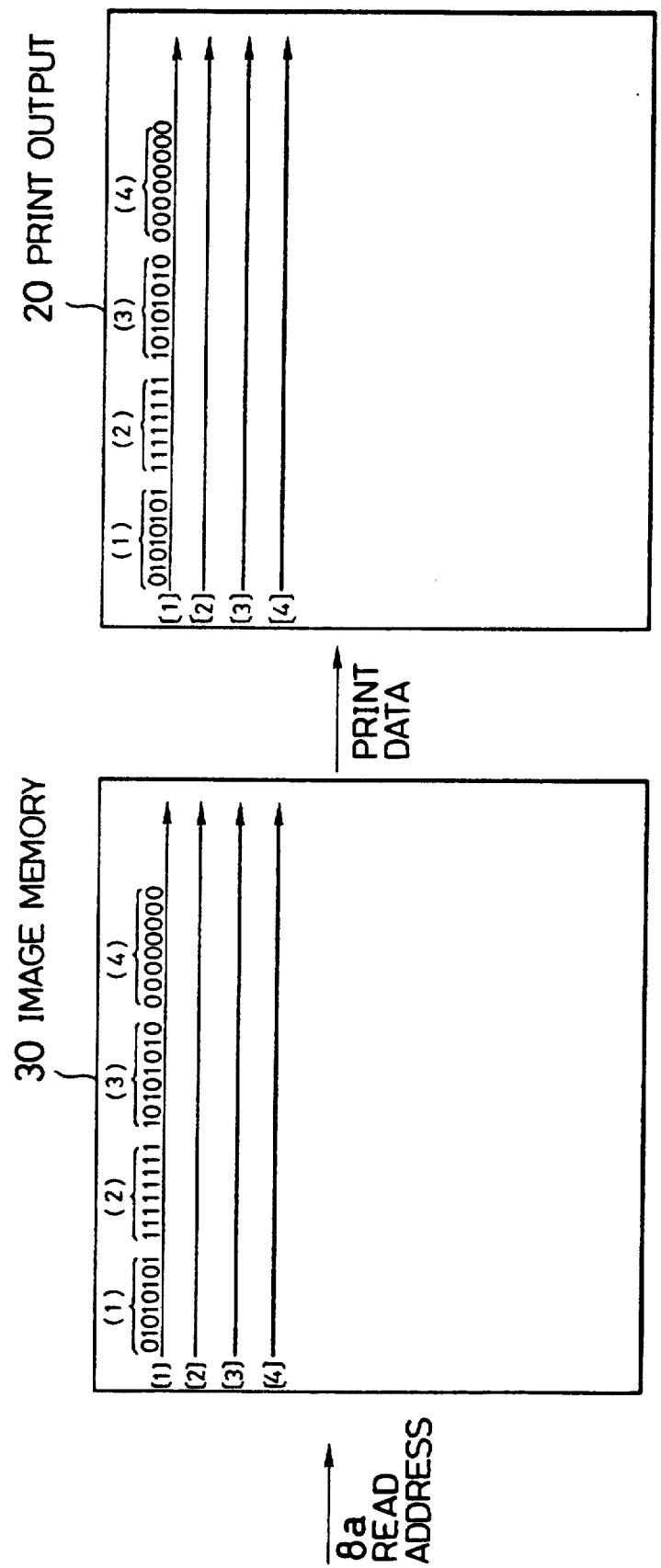
FIG. 4 is a schematic diagram showing how the print data are output from the image memory in the prior art.

FIG. 4 is a schematic diagram for explaining the reading operation of the print outputs from the image memory in the prior art.

As illustrated, when read addresses 8a are successively inputted into the image memory 30, data in the image memory 30 corresponding to the respective words (1), (2), (3) and so on, of the respective rasters [1], [2], [3], [4], and so on are successively read out, and printed in the same order to obtain the print output 20. That is, image data are read out word by word and transformed into a bit stream for each raster, and sent to the print engine 10, by which dots corresponding to the respective signals are printed to obtain the print output 20.

The image memory 30 is usually set to have a storage capacity adequate for print output 20 of one page.

Figure 5:
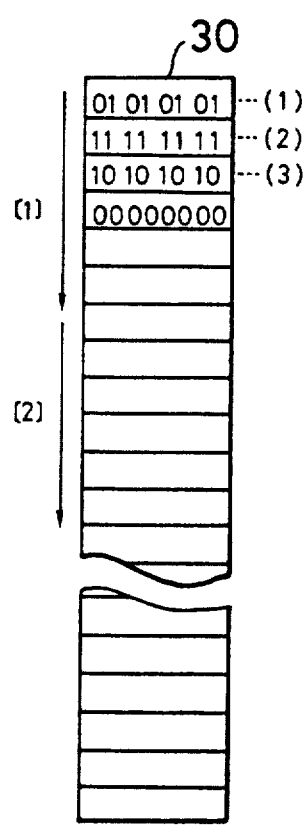
FIG. 5 is a schematic diagram showing how the print data are stored in the image memory in the prior art.

FIG. 4 shows allocation of words (each word containing 8 bits, for example) in the image memory schematically. In FIG. 4, the positions of the memory locations in the image memory correspond to the positions on the printing output page. FIG. 5 is another form of representation. In FIG. 5, the words are shown in an array, in a single sequence. The respective words of image data are stored in the respective memory locations in the image memory 30. In the prior art, each word of image data is stored in the image memory 30 corresponding to the position on the print output page at which the particular word of the image data should appear (i.e., should be printed). In the invention, this correspondence is not maintained. This is because words contained in the empty blocks are not stored in the image memory, and the effective blocks are stored in succession, without leaving empty blocks therebetween. This will be better understood from the following description of the concept of the invention with reference to FIG. 6.

Figure 6:
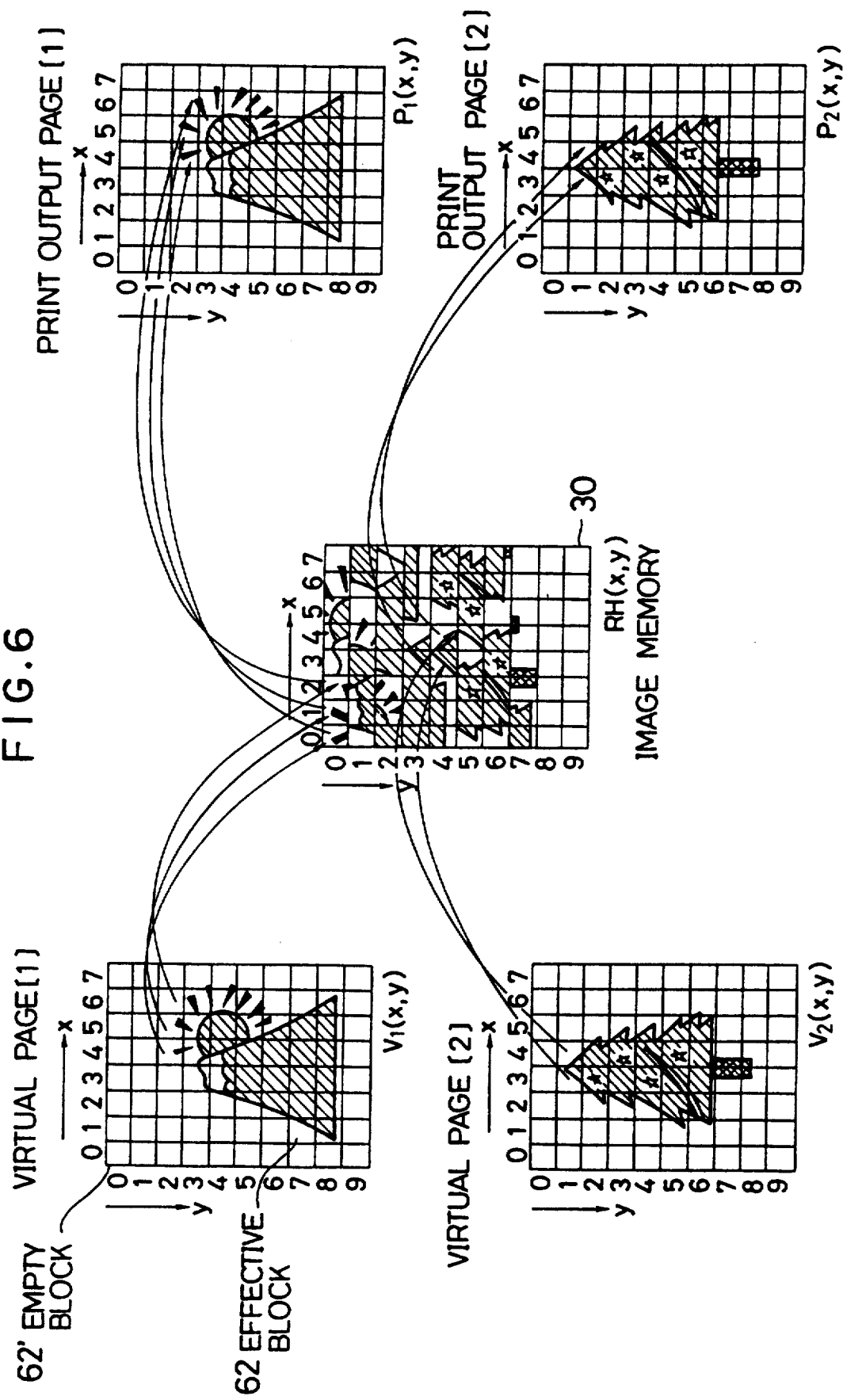
FIG. 6 is a schematic diagram showing how the print data of are dismantled and assembled during writing into the image memory and during reading form the image memory.

In FIG. 6, it is assumed that print data of two virtual pages [1] and [2] are stored in the image memory simultaneously. It should be noted that page [1] does not necessarily mean the first page in a series of pages making up of a complete document to be printed, but rather successive pages are alternately named as page [1] and page [2].

Each of the virtual pages is divided into blocks 62 and 62'. Each block may for example consists of 128×128 bits. The blocks can be classified into empty blocks 62' containing empty data only (all "0"), and effective blocks 62 containing effective data (at least one bit having a value "1"). The print control unit 8 shown in FIG. 2 writes only the data in the effective blocks 62 within the virtual pages in the image memory 30. With this arrangement, the image of the virtual pages are dismantled into segments, but the effective blocks 62 of more than one page can be concurrently stored in the image memory 30 having a capacity of a single print output page.

In this way, in order to obtain print outputs [1] and [2] shown on the right of FIG. 6, after writing the print data in image memory 30, whether or not each block is an empty block 62' is judged, and if it is an empty block, the memory block assignment control section 42 generates the empty data and outputs it to the print engine 10, and if it is an effective block 62 data corresponding to the effective block are read from the image memory 30 and output to the print engine 10. Such a process for supplying the print engine 10 with print data can be conducted for each page, block by block, starting with the first block with coordinate X, Y=(0,0).

Thus, print outputs corresponding to the virtual pages can be reproduced. Moreover, while the print output [1] for one of the virtual pages [1] and [2] is printed, the print data for the other virtual page can simultaneously be written in the image memory 30. Accordingly, when data of the first virtual page have been written in the image memory 30, they can be supplied to the writing device 16, and also writing of data of the second virtual page can be commenced. The data of the second virtual page can be written in the image memory 30 starting at the block next to the block in which the last effective block in the first virtual page is stored. Similarly, if data of a third virtual page are inputted, the effective blocks in the third virtual page can be written in the image memory 30, starting at the block next to the block in which the last effective block of the second virtual page is stored. Similar process is continued.

For rewriting the print data in the image memory 30, the image memory 30 has to be cleared before the writing new data. This is because of the algorithm used. In the invention, the clearance of the image memory is performed one block at a time, immediately before new data of an effective block are written. This contributes to a great saving of the memory clearance operation and the time therefor.

Figure 3:
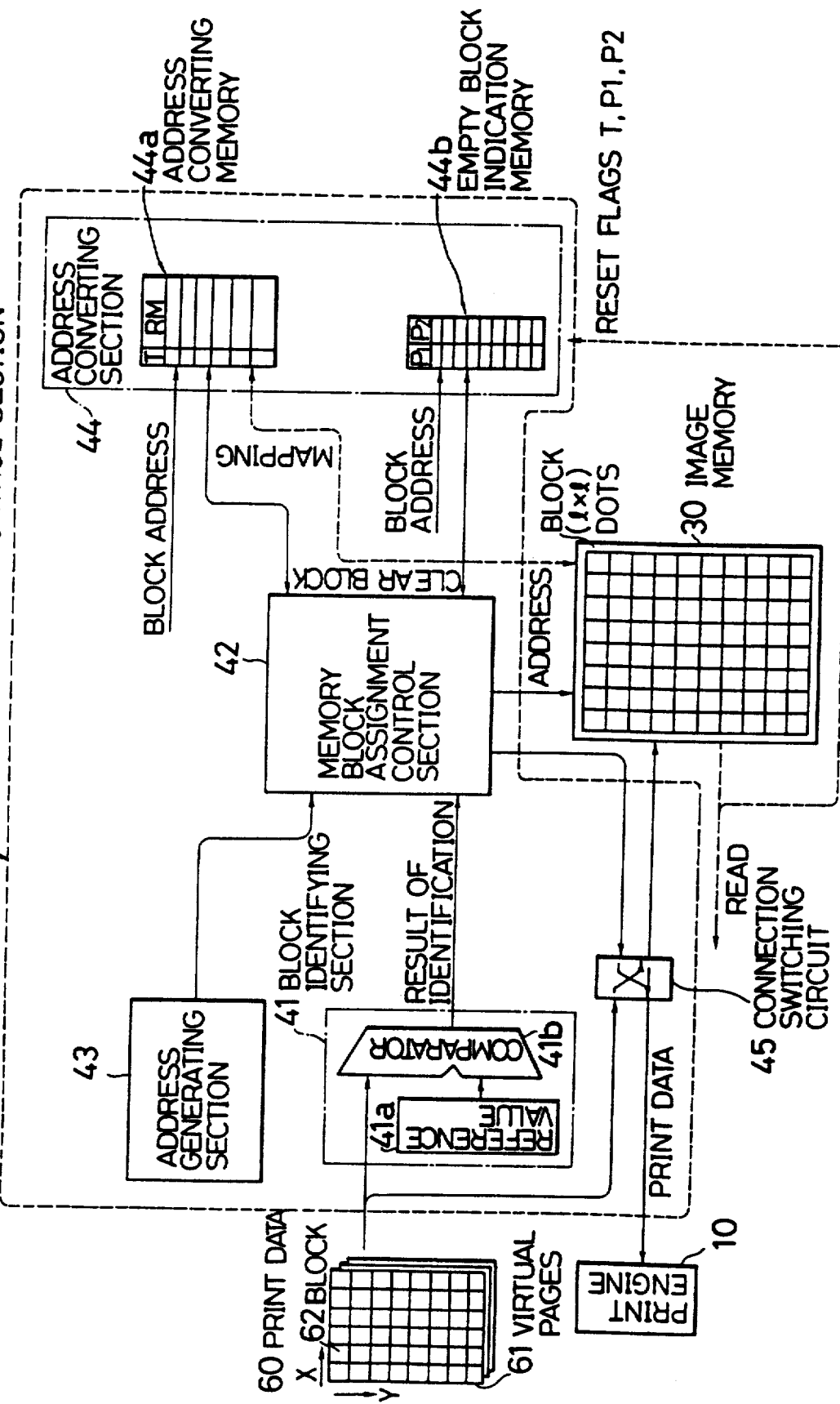
FIG. 3 is a schematic diagram showing the details of the image memory control section.

FIG. 3 is a block diagram showing details of the image memory control section 40, and how its components are connected with other components in the printing apparatus shown in FIG. 1.

The image memory control section 40 comprises a block identifying section 41 for receiving print data 60 from the working memory 6, dividing each virtual page consisting of image of one print output page, into a plurality of blocks, and identifying whether each block is an empty block consisting only of empty data or an effective block containing effective data.

The image memory control section 40 also comprises a memory block assignment control section 42 for assigning a memory location in the image memory 30 for writing image data. The image memory control section 40 further comprises a block address generating section 43 for generating a block address, and a connection switching circuit 45 for switching the path for input of data to be written into the image memory 30 or for output of data read from the image memory 30. The memory block assignment control section 42, the block address generating section 43 and the connection switching section 45 form a writing control section which is responsive to the result of the identification by the block identifying section 41 for selecting only the effective blocks and for writing data into the image memory 30, block by block.

The image memory control section 40 further comprises an address converting section 44 for performing address conversion. That is, the address converting section 44 correlates the virtual page block address, i.e., the block address within the virtual page with the image memory block address, i.e., the block address within the image memory 30 in which the effective block has been written, and storing mapping flags for discriminating between the effective block and the empty block within the virtual page, and a page identification flags for identifying the virtual page to which each effective block that has been written in the image memory belongs.

As mentioned before, the print data 60 for the virtual page 61 are divided into a plurality of blocks 62.

Print data 60 in the working memory are processed page by page, and block by block.

During writing, when addresses of the virtual page are generated by the address generating section 43, the data are input to the block identifying section 41 and the connection switching circuit 45. The block identifying section 41 judges whether each of the blocks 62 constituting the virtual page 61 is an empty block or an effective block. That is, the value of writing data, i.e., the number of bits having a value "1" in the word and a reference value 41a (data set for the level of the empty block, that is set at "0") are input to a comparator 41b provided in the block identifying section 41. When they match for all the words within a particular block, the block is found to be an empty block. When they do not match with regard to any of the words in the block, the block is found to be an effective block. The result of the identification is output to the block assignment control section 42.

The memory block assignment control section 42 is a circuit formed of a microprocessor or the like for controlling writing of data into the image memory 30. The memory block assignment control section 42 is responsive to the result of identification output from the comparator 41b for performing control to prevent the writing of data into the image memory 30 when the block of the virtual page 61 consists of empty data only, and to permit writing of the data for inputting via the connection switching circuit 45 into the image memory 30 at proper memory locations when the block contains effective data.

The address converting section 44 includes an address converting memory 44a and an empty block indication memory 44b. The address converting section 44 is illustrated in greater detail in FIG. 7. The address converting memory 44a stores, at each of the addresses corresponding to the block addresses Vn(x,y) of the respective virtual pages n, mapping flags T for indicating whether the particular block address of the virtual page is an effective block or an empty block, and in case of an effective block, the address RM(x,y) of the image memory block in which data of the virtual page block are stored.

The address value RM(x,y) as stored at the memory location Vn(x,y) in the address converting memory 44a indicates the block address in the image memory 30 in which the block (x,y) of the virtual page [n] (n=1 or 2) is stored. The address converting memory 44a has a capacity for storing flags for a plurality of virtual pages.

The empty block indication memory 44b stores, at each of its memory locations corresponding to the image memory block addresses, page identification flags in columns P1 and P2 respectively corresponding to the virtual page [1] and the virtual page [2] for identifying the virtual page whose data have been written in each memory location in the image memory 30. That is, if the page identification flag is set at "1" in a column P1 at a certain address RM(x,y), it means that data of a block of the virtual page [1] are stored in the memory block RM(x,y) in the image memory 30. The page identifications flags are stored for all the image memory block addresses RM(x,y). After the image data for the first virtual page have been read out of the image memory, and written by the writing device 16, the flags in the column P1 can be cleared and the column P1 can be used for storing the flags for a next virtual page, i.e., the third page, if the virtual page [1] and virtual page [2] initially correspond to the first and the second virtual pages. Similarly, the fourth virtual page can use the column P2, and so on. The number of columns P1, P2 and the like can be increased. If for example, four columns P1 to P4 are provided, the first to fourth virtual pages can use the first to fourth columns P1 to P4, and the fifth virtual page is made use the first column P1, the sixth virtual page uses the second column P2, and so on.

The memory block assignment control section 42 refers to the address converting section 44 for writing data of the virtual page, in the manner described with reference to FIG. 6, and reads the data via the connection switching circuit 45 to the print engine 10.

Figure 8:
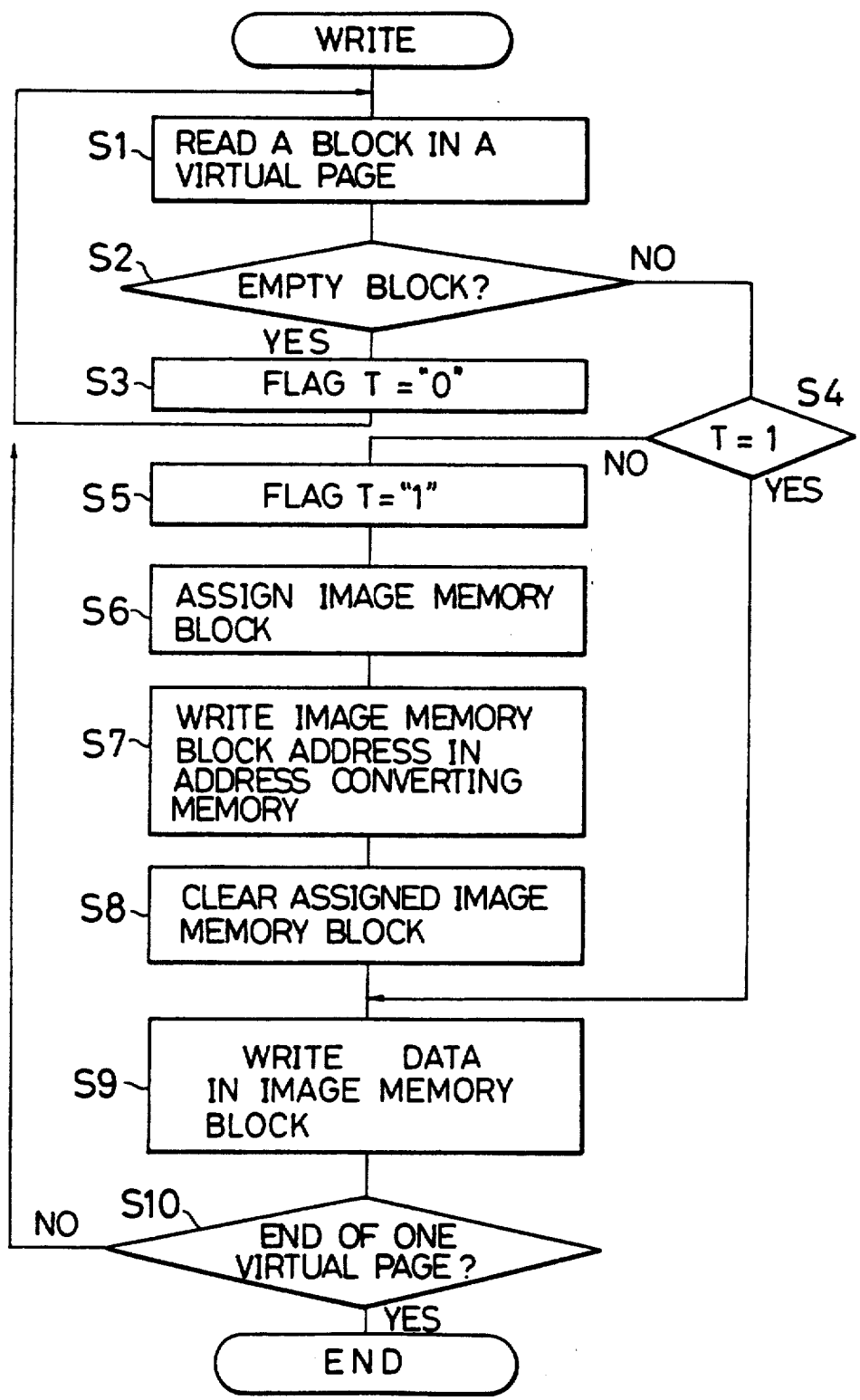
FIG. 8 is a flow chart showing the operation of the printing apparatus during writing of the print data in the image memory.

FIG. 8 is a flow chart showing the operation of the data writing in the apparatus of the present invention.

In the figure, when writing operation is commenced, reading of the virtual page is conducted (step S1). The blocks are processed starting with the first block. First, judgment is made on whether or not the block read out is an empty block (step S2). In the case of the empty block, the flag T of the block of the corresponding page in the address converting memory is kept at "0" (step S3).

If the block read out is not an empty block, judgment is made on whether or not the flag T is "1" (step S4). Initially, when the first data in the corresponding block is written, the flag T is at "0", so the flag T of the block of the corresponding virtual page in the address converting memory is set to "1" (step S5). Then, the empty block indication memory 44b is referred to, to determine the image memory block address RM(x,y) in which the data should be written (step S6).

Next, the corresponding block address RM(x,y) is written in the address converting memory 44a (step S7). Then, before the writing of the data, the corresponding image memory block is cleared (step S8). Then, the data in the effective block in the virtual page are written in the corresponding image memory block (step S9). After that, judgment is made on whether or not the writing operation for the entire virtual page has been completed (step S10). When the writing operation for the entire virtual page has not been completed, the next step is the step S1. After the first effective data in the block have been written the flag T is at "1", so the step S4 is followed by the step S9, and the next data are overwritten in the corresponding block in the image memory.

When the first effective data of another block are written, the step S4 is followed by the step S5.

Figure 9:
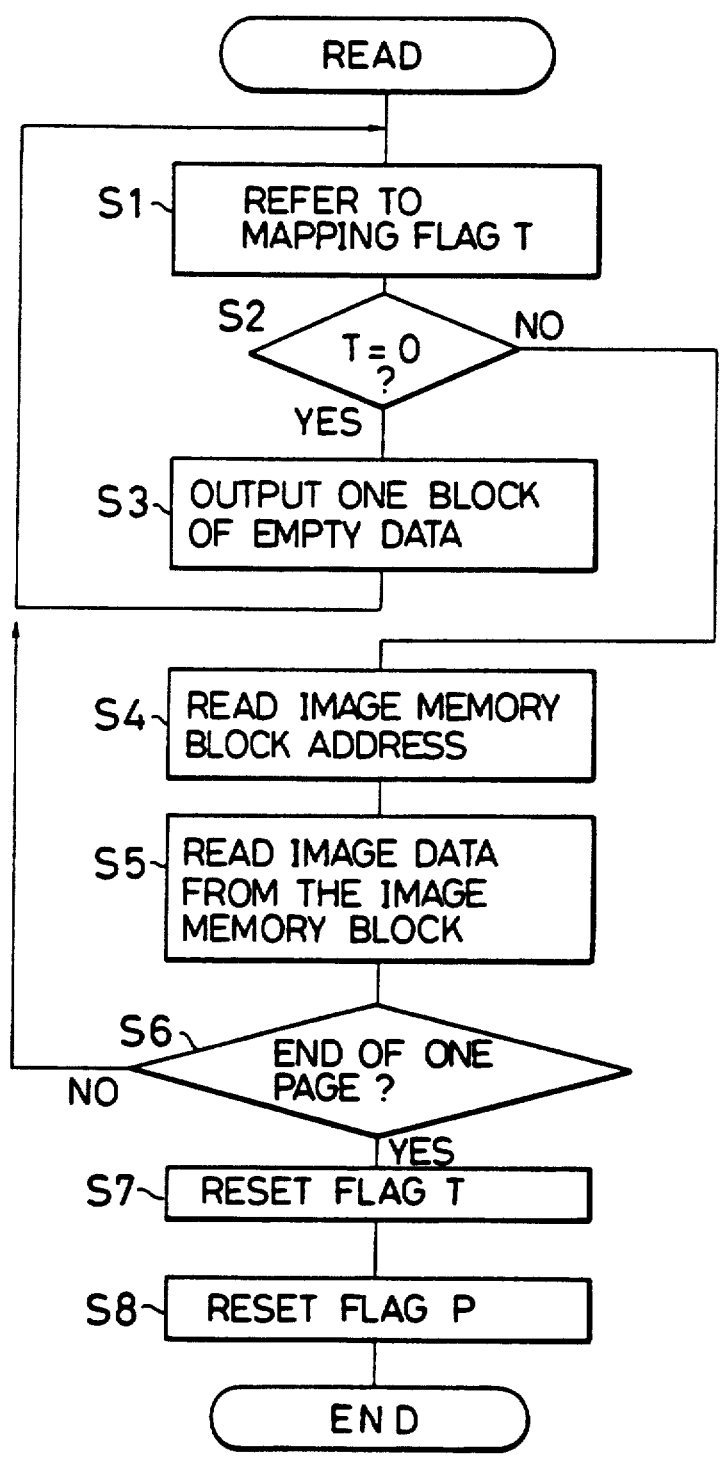
FIG. 9 is a flow chart showing the operation of the printing apparatus during reading of the print data from the image memory.

FIG. 9 is a flow chart showing the operation of the data reading.

When the reading operation is commenced, the mapping flag T in the address converting memory is first referred to (step S1). Then, judgment is made on whether or not the flag T is "0" (step S2). If the flag T is at "0", the block in question is an empty block, so the empty data of one block is output (step S3). If the flag T is not at "0", the block in question is an effective block, then the corresponding image memory block at the address RM(x,y) is referred to (step S4). Then, the effective block of data at the image memory block address RM(x,y) are read out (step S5). After that, judgment is made on whether the reading for the one page has been completed (step S6). If it has not been completed, the next step is the step S1. If it has been completed, the next step is the step S7. When the reading for one page has been completed, the flags T in the address converting memory 44a corresponding to the virtual page whose data have been read out are all reset. Moreover, in the empty block indication memory, the flags in column P1 or P2 assigned to the particular virtual page are all reset (step S8).

During reading, the image memory is not cleared.

Now the operation of the assignment of the image memory blocks to the virtual page blocks are described in greater detail.

As with the mapping flags, the page identification flag is set at "1" when the mapping has been made, and is set at "0" when the mapping has not been made. Accordingly, for each block of the image memory 30, the fact that the page identification flags (in the columns P1, P2) are all "0" means that no mapping has been made on the block, and the fact that any of the page identification flags (in the columns P1, P2) is at "1" mean that mapping has been made. For newly writing an effective block, to locate an empty image memory block, the empty block indication memory 44b which stores the page identification flags is referred to.

Before any given virtual page block is found to be an effective block, the mapping flag is kept unchanged at "0" and the image memory block address RM(x,y) is kept indefinite. When the particular block is found to be effective, the memory block assignment control section 42 assigns an unused image memory block by referring to the page identification flags in the empty block indication memory 44b. For instance, the unused image memory block immediately following the series of the used image memory blocks is selected. Here, the term "used image memory block" means the image memory block in which the image data waiting for printing are stored, while the term "unused image memory block" covers the image memory block from which the image data have already been read for being sent to the writing device 16 for printing, as well as the image memory block in which image data for printing have never been written after the system has started the operation. When an unused image memory block is assigned, the appropriate page identification flag, depending on which of the virtual page [1] and virtual page [2] is being written, is set at "1", and the image memory block address RM(x,y) is written at the memory location Vn(x,y) in the address converting memory 44a corresponding to the virtual page block being written, and the mapping flag at the same memory location Vn(x,y) is set at "1". Then, the image memory block RM(x,y) which has been assigned to the virtual page block Vn(x,y) is cleared. After the memory clearance, the data of the particular virtual page block are written in the image memory block that has been assigned.

When data of virtual page block have been written in an image memory block, the page identification flag is set in the column P1 in the empty block indication memory 44b to enable identification of the virtual page whose data have been stored in the memory block designated by the image memory block address RM(x,y).

In this way, when the address generating section 43 in FIG. 3 supplies addresses for one page, writing of one virtual page into the image memory 30 is conducted. Then, writing of data of the next virtual page is commenced.

In parallel therewith, the printing of the page that has already been written can be effected. In this case, the address generating section 43 generates the virtual page addresses Vn(x,y) along the rasters in FIG. 3. Responsive to the addresses, the memory block assignment control section 42 refers to the mapping flag T at the address Vn(x,y) in the address converting memory 44a.

If the mapping flag T at the address Vn(x,y) is at "1", the value of the image memory block address RM(x,y) as stored at the same address Vn(x,y) in the block address converting memory 44a is referred to and the data are read from the image memory block designated by the address value RM(x,y) as read out from the address converting memory 44a, and the print data are sent via the connection switching circuit 45 to the print engine 10. Moreover, if the mapping flag T which is referred to is at "0" the memory block assignment control section 42 generates empty data, which are then sent via the connection switching circuit 45 to the print engine 10, as the print data for the virtual page block.

When operations similar to the above are successively effected block by block, then the image of the virtual page 61 can be reproduced as a print output, as shown in FIG. 6. When the reading is completed, the mapping flags T in the virtual page are all reset or cleared to "0". This permits the writing of the next virtual page.

It has been explained for the sake of simplicity, as if image data are processed block by block. But in fact, the image data are processed word by word. Whether or not each block is empty is determined by accumulation of results of determination of emptiness of each word in the block. Thus, the comparator compares the value of each word with a reference value "0".

If all the words in a particular block are found to be empty, the block is found to be empty. If any of the words in the block is found to be effective, the block is found to be effective.

Before the first data word in any virtual page block are detected, the mapping flag that is initially set at "0" is kept unchanged and the block address RM(x,y) in the image memory 30 is kept indefinite. When the first word in the virtual page block is detected, the mapping flag T at the address Vn(x,y) in the address converting memory 44a is raised to "1", the address value RM(x,y) of the image memory block address is written at the memory location Vn(x,y), and the page identification flag in the corresponding column P1 or P2, at the corresponding address is raised to "1". Then, an unused image memory block RM(x,y) which has been assigned to the virtual page block Vn(x,y) is cleared, and then the data of the first word in the virtual page block are written in the appropriate, or corresponding word location in the image memory block that has been assigned. Following the data of the first word, data of the subsequent words in the same block are successively read. Each time reading is effected, when the mapping flag T is referred to, it is found to be set at "1" meaning that mapping has been made, so that the data are written in the corresponding word location in the image memory block. An address pointer, not shown, is provided for the image memory 30 and incremented each time data of one word are written.

The present invention is not limited to the above embodiments.

The address converting section 44 can have different configurations. What are required of the address converting section 44 are that it correlates the virtual page block address with the image memory block address, that mapping flags are provided for identifying whether each virtual page block is an effective block or an empty block, and that page identification flags are provided for identifying the virtual page containing the effective block that has been written in each image memory block.

Figure 7:
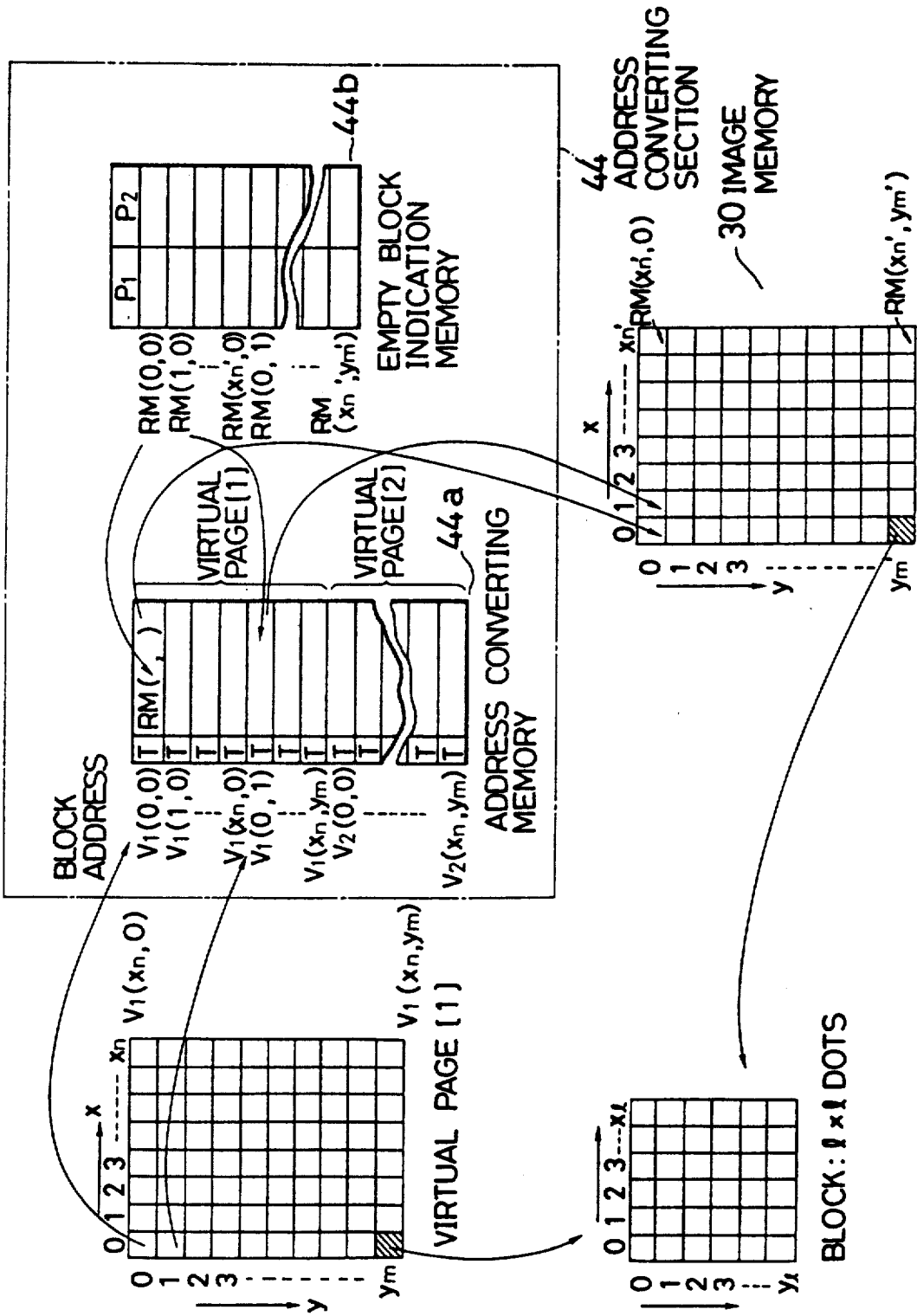
FIG. 7 is a schematic diagram showing details of the address converting section.

Accordingly, it is not necessary to provide the address converting memory 44a and the empty block indication memory 44b separately as shown in FIG. 3 and FIG. 7.

Figure 10:
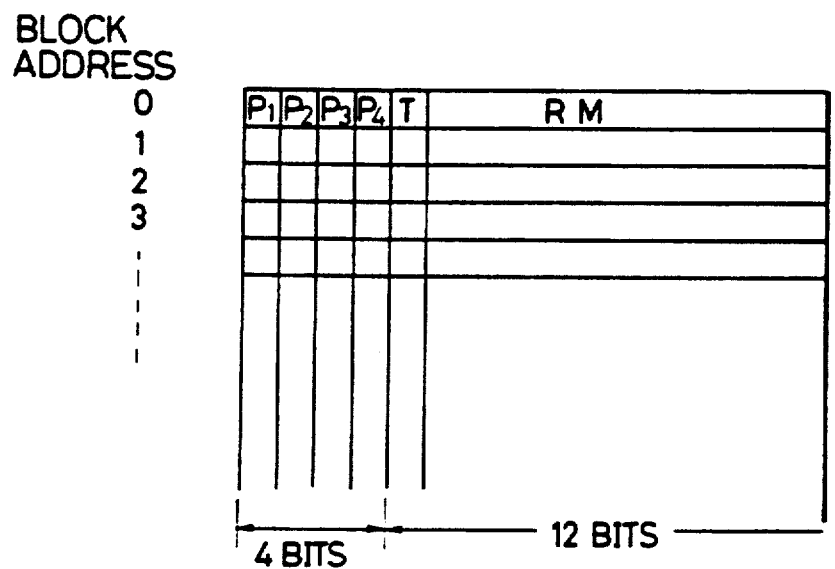
FIG. 10 is a schematic diagram showing a modification of the address converting section.

FIG. 10 shows a modification of the address converting section.

The address values are made to represent virtual page block addresses Vn(x,y) when the image memory block address RM(x,y) or the mapping flag T is referred to, while the address values are made to represent the image memory block addresses RM(x,y) when the page identification flags are referred to.

It is assumed that each memory location can store 16 bits of information. Here, the address converting section is configured assuming that the four virtual pages can be concurrently stored in the image memory. That is, four bits of page identification flags, one bit of the mapping flag, and remaining eleven bits of block addresses are provided.

When the table data are integrated into one in this way, the control signal can be simplified, and the memory capacity can be reduced, so that the circuit can be implemented by LSI (large scale integration). Moreover, if the mapping flags T can be coded, mapping flags for four pages can be represented by two bits.

In addition, when the contents of the virtual page is simple, more virtual pages can be written in a single image memory 30.

Figure 11:
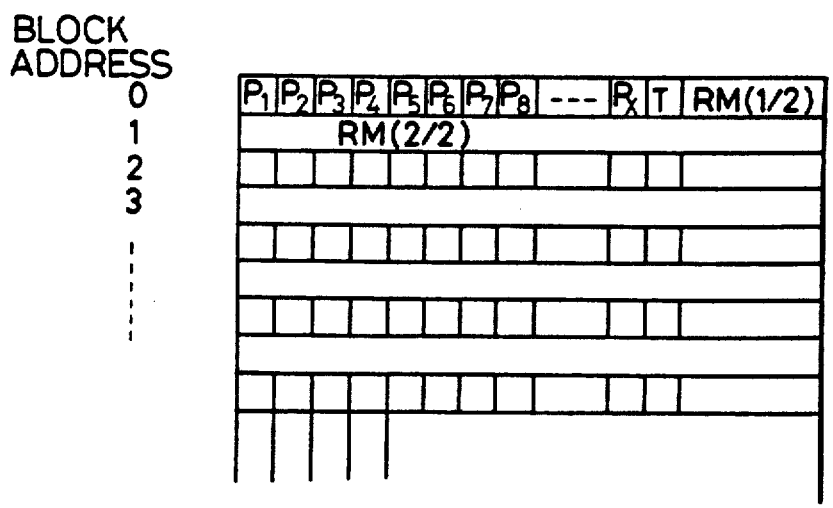
FIG. 11 is a schematic diagram showing another modification of the address converting section.

FIG. 11 is another modification of the address converting section for the case where a larger number of virtual pages are written, i.e., more precisely, the sum of the number of virtual pages that can be stored concurrently in the image memory, and the number of bits of the addresses of the image memory block plus one for the mapping flag T is greater than the number of bits of the data that can be stored in each memory location (which is assumed to be 16). In this case, two adjacent memory locations are used in combination. In the first memory location of each combination, page identification flags P1 to Px, and the mapping flag T and part of the image memory block address value RM(x,y) are stored. In the second memory location of each combination, the remaining part of the image memory block address value RM(x,y) is stored. Each of the virtual page block addresses is made to correspond to the first memory location in each combination. The virtual page block addresses are made to correspond to the alternate memory locations.

By the method described above, the structure of the address converting section 44 is simplified and the operation of the memory block assignment control section 42 can be simplified.

The printing section is not limited to one of the electrophotography type, but can be of the wire dot type, and the like. The print control unit can be replaced by any of various circuits having similar functions.

According to the printing apparatus of the invention that has been described, an image memory of a relatively small capacity, such as one for a single page is used to store print data for two or more pages, and high-speed printing without waiting time is possible. Moreover, because of the reduction of the memory capacity, the cost of the printing apparatus can be lowered.

Furthermore, clearance of the image memory is conducted for the parts corresponding to the effective blocks of the virtual page corresponding to the print data, so unnecessary clearance operation can be considerably reduced as compared with the prior art, with the result that the speed-up of the printing can be achieved.

What is claimed is:

1. A printing apparatus for printing on printing paper, page by page, wherein print data of each of virtual pages are divided into blocks, comprising:
    a working memory for storing print data of virtual pages,
    an image memory for storing print data of effective blocks containing effective data,
    a printing section receiving the print data from the image memory for printing on the printing paper,
    an image memory control section for controlling writing of the print data in said image memory, and reading of the print data from the image memory, wherein
    said image memory control section comprises
    a block identifying section responsive to the print data from the working memory and dividing each virtual page from the working memory into a plurality of blocks, said block identifying section identifying whether each block is an effective block containing effective data or an empty block containing no effective data,
    an address converting section responsive to the result of the identification of said block identifying section for correlating the block addresses of the effective blocks within said virtual page with the block addresses within said image memory in which the data of said effective blocks are written by storing an address of the image memory block in which effective data of the vertical page block are stored, and storing mapping flags for indicating whether each block of the virtual page is an effective block or an empty block, the address converting section further including an empty block indication memory which stores at each of its memory locations corresponding to said image memory block address, page identification flags for identifying the virtual page to which data of each effective block that have been written in said image memory belongs, said page identification flags being arranged in respective columns corresponding to the virtual page of which the effective block is stored in said location in the image memory,
    a memory block assignment control section receiving the result of the identification by said block identification and referring to the page identification flags stored in said address converting section for assigning, during writing of the print data in said image memory, a block in the image memory that is available for print data of an effective block, the assignment being made in succession so that no empty block is left between effective blocks,
    said memory block assignment control section controlling the writing of the print data of the effective blocks in said image memory and for preventing the writing of data in said image memory when the block is an empty block, and storing information on the print data of an empty block, and supplying the print data of the effective blocks from the image memory to the printing section by referring to said page identification flags, and supplying the print data of the empty blocks to said printing section.

2. A printing apparatus according to claim 1, wherein said image memory control section further comprises
    an address generating section for generating addresses of the print data in said working memory for supplying the print data from the working memory, block by block, to said image memory.

3. A printing apparatus according to claim 2, wherein said address generating section successively generates addresses of data for each block, during writing into said image memory and during reading from said image memory.

4. A printing apparatus according to claim 1, wherein said memory block assignment control section clears the assigned block in said image memory after the assignment of image data and before writing the print data in said block.

5. A printing apparatus according to claim 1, wherein said image memory control section resets said mapping flag and said page identification flag after reading the data of the the effective block from said image memory.

6. A printing apparatus according to claim 1, wherein each of said blocks consists of pixel signals corresponding to pixels arranged in a rectangular area in the print output page.

7. A printing apparatus according to claim 1, wherein the print data as stored in said image memory and as supplied to said printing section are in the form of pixel signals respectively representing dots forming a matrix of dots.

* * * * *